United States Patent
Wu et al.

(10) Patent No.: US 6,738,598 B2
(45) Date of Patent: May 18, 2004

(54) MULTILAYER RADIO FREQUENCY INTERCONNECT SYSTEM

(75) Inventors: Shih-Chang Wu, Rancho Palos Verdes, CA (US); Yaozhong Liu, Torrance, CA (US)

(73) Assignee: The Boeing Company, Chicago, IL (US)

( * ) Notice: Subject to any disclaimer, the term of this patent is extended or adjusted under 35 U.S.C. 154(b) by 497 days.

(21) Appl. No.: 09/932,804

(22) Filed: Aug. 17, 2001

(65) Prior Publication Data

US 2003/0036349 A1 Feb. 20, 2003

(51) Int. Cl.[7] ............................................... H04B 7/185
(52) U.S. Cl. ............................. 455/12.1; 343/700 MS; 343/846; 455/13.3; 455/13.1; 455/427
(58) Field of Search ................................ 455/12.1, 13.3, 455/13.1, 427; 343/700 MS, 846

(56) References Cited

U.S. PATENT DOCUMENTS

| | | | | |
|---|---|---|---|---|
| 5,455,594 A | * | 10/1995 | Blasing et al. | ....... 343/700 MS |
| 6,114,997 A | * | 9/2000 | Lee et al. | ............ 343/700 MS |
| 6,249,439 B1 | * | 6/2001 | DeMore et al. | ............. 361/752 |
| 2003/0103006 A1 | * | 6/2003 | Yamada | ............... 343/700 MS |

* cited by examiner

Primary Examiner—Nay Maung
Assistant Examiner—Shaima Q. Aminzay
(74) Attorney, Agent, or Firm—Terje Gudmestad

(57) ABSTRACT

A multilayer radio frequency interconnect apparatus includes a plurality of laminated printed wiring boards made of a dielectric material with low loss characteristics for radio frequency electromagnetic radiation. In operation, a RF signal launches from a first signal conductor 24. A vertical transition from the first signal conductor 24 to a second signal conductor 44 is realized by a 3-wire transmission line. The center conductor of the 3-wire transmission line is a RF via 30. The two outer conductors are RF ground vias 32 and connect the first RF ground conductor 22 to the second RF ground conductor 42. These two RF ground vias 32 are isolated from the ground planes 40, 46 which are located between RF signal layers 20, 38. The advantage of this ground isolation is to maintain the 3-wire transmission line characteristic impedance and to reduce disturbance to electromagnetic fields such that a broadband design may be achieved. The RF ground vias are terminated at signal layers 20, 38.

12 Claims, 1 Drawing Sheet

MULTILAYER RADIO FREQUENCY INTERCONNECT SYSTEM

TECHNICAL FIELD

The present invention relates generally to electronic components, and more particularly, to a multilayer radio frequency interconnect system.

BACKGROUND ART

Multilayer support structures for electronic components are well known. Examples of known support structures include multiple wiring layer printed circuit boards, multichip modules (MCMs) and high density multichip modules (HDMIs) employing multiple wiring layer substrates, and multiple wiring layer single integrated circuits (ICs). The wiring layers are separated from one another by dielectric materials such as, for example, phenolic resin, epoxy, ceramic, silicon, silicon dioxide or polyimide.

A conventional method for electrically connecting one wiring layer to another, i.e., "interlayer connection," is by a perpendicular conductive through-via extending from one layer, through the dielectric, to the other layer. The other layer may be, for example, a signal layer or a ground layer. There are various specific structures for the interconnection, and these are selected based, for example, on the particular support structure, the number of wiring layers, and the number of the wiring layers connected by the specific via.

Good radio frequency (RF) performance depends on the ability to transfer power between the various layers of the substrate without introducing excessive, additional RF loss. Previously, the RF ground vias in coplanar waveguide to three-wire to coplanar waveguide transitions have been connected to a ground layer and to the backside conductor. From an electromagnetics viewpoint, this type of geometry creates an unbalanced structure, which results in narrow band performance.

Multilayer interconnect manufacturers have not substantially addressed the problem of narrow band performance. This has made it apparent that a new technique for connecting multilayer components is needed. The new technique should substantially minimize electromagnetic field disturbance in multilayer interconnects. The present invention is directed to this end.

SUMMARY OF THE INVENTION

It is, therefore, an object of this invention to provide an improved and reliable multilayer radio frequency interconnect system. Another object of the invention is to substantially minimize electromagnetic field disturbance in multilayer interconnects.

In accordance with the objects of this invention, a multilayer radio frequency interconnect system is provided. In one embodiment of the invention, a multilayer radio frequency interconnect apparatus includes a plurality of laminated printed wiring boards made of a dielectric material with low loss characteristics for radio frequency electromagnetic radiation. In operation, a RF signal launches from a first signal conductor 24. A vertical transition from the first signal conductor 24 to a second signal conductor 44 is realized by a 3-wire transmission line. The center conductor of the 3-wire transmission line is a RF via 30. The two outer conductors are RF ground vias 32 and connect the first RF ground conductor 22 to the second RF ground conductor 42. These two RF ground vias 32 are isolated from the ground planes 40, 46 which are located between RF signal layers 20, 38. The advantage of this ground isolation is to maintain the 3-wire transmission line characteristic impedance and to reduce disturbance to electromagnetic fields such that a broadband design may be achieved. The RF ground vias are terminated at signal layers 20, 38.

The present invention thus achieves an improved multilayer radio frequency interconnect system. The present invention is advantageous in that it is capable substantially minimizing electromagnetic field disturbance in multilayer interconnects.

Additional advantages and features of the present invention will become apparent from the description that follows and may be realized by means of the instrumentalities and combinations particularly pointed out in the appended claims taken in conjunction with the accompanying drawings.

BRIEF DESCRIPTION OF THE DRAWINGS

In order that the invention may be well understood, there will now be described some embodiments thereof taken by way of example, reference being made to the accompanying drawings in which.

BEST MODES FOR CARRYING OUT THE INVENTION

Figure 1:
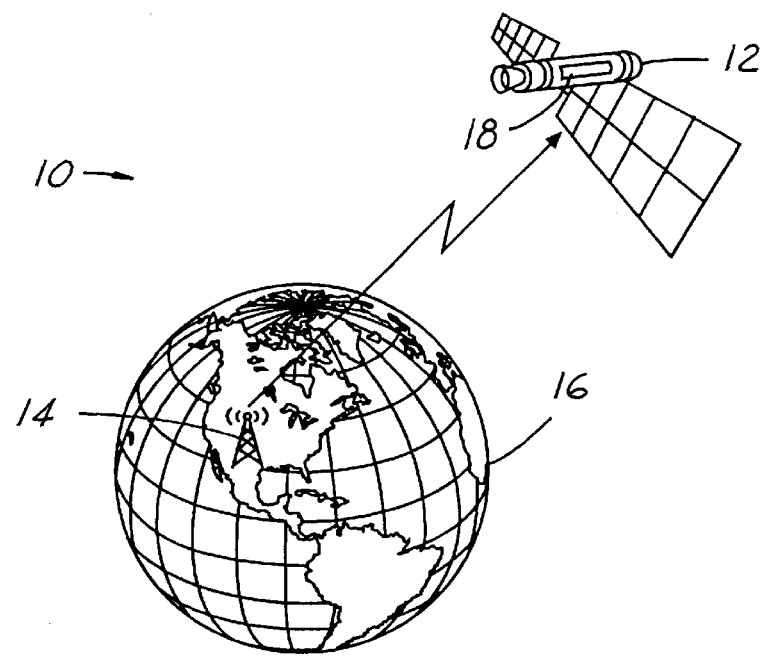
FIG. 1 is a perspective view of a satellite system having a multilayer radio frequency interconnect apparatus in accordance with one embodiment of the present invention.

In the following Figures, the same reference numerals will be used to identify identical components of the various views. The present invention is illustrated with respect to a multilayer radio frequency interconnect system particularly suited for the aerospace field. However, the present invention is applicable to various and other uses that may require a multilayer radio frequency interconnect system.

Referring to FIG. 1, a perspective view of a satellite system 10 having a multilayer radio frequency interconnect apparatus 18 in accordance with one embodiment of the present invention is illustrated. The satellite system 10 is comprised of one or more satellites 12 in communication with a ground station 14 located on the Earth 16. Each satellite includes an multilayer radio frequency interconnect apparatus 18.

In the past, the radio frequency vias in coplanar waveguide to 3-wire to coplanar waveguide transitions have been connected to a ground layer and to a backside conductor. From an electromagnetic point of view, this typ of geometry represents an unbalanced structure, which results in narrowband performance. Additional via length from a radio frequency ground plane to a backside ground plane also results in a short stub, which will cause mismatching. The present invention minimizes the disturbance to the electromagnetic fields and results in a better radio frequency transition.

Figure 2:
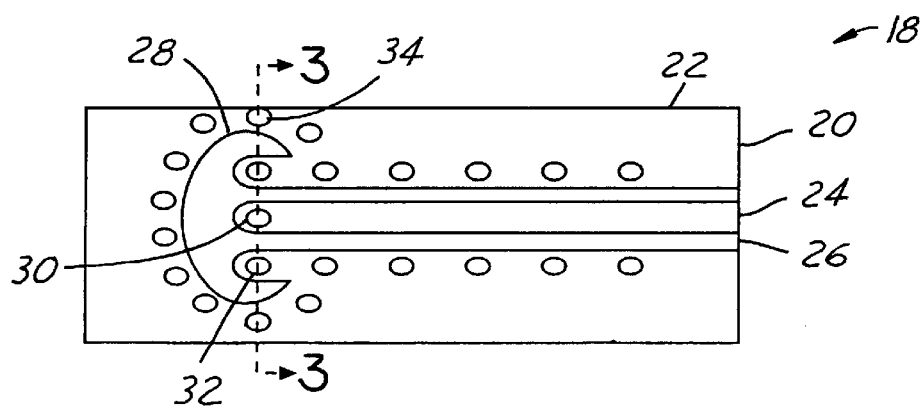
FIG. 2 is a top view of a multilayer radio frequency interconnect apparatus according to the present invention.

Referring to FIG. 2, a top view of a multilayer radio frequency interconnect apparatus 18 according to the present invention is illustrated. Apparatus 18 is comprised of a plurality laminated printed wiring boards made of a dielectric material with low loss characteristics for radio frequency electromagnetic radiation. Each printed wiring board is, of course, clad with a conductive metal. A laminating agent is used to bond the printed wiring boards together to form apparatus 18. Suitable laminating materials include FEP (a Teflon bonding material available from Dupont), Arlon 6700 bonding film, or other bonding materials common to standard multilayer PWB manufacture.

Multilayer radio frequency interconnect apparatus 18 includes a first coplanar wave guide (CPW) signal layer 20 disposed upon a plurality of interconnect layers (not shown). First coplanar wave guide (CPW) signal layer 20 is etched to include a first RF ground conductor 22, and a first signal conductor 24. First signal conductor 24 is separated from first RF ground conductor 22 by a gap 26. First RF ground conductor 22 includes a signal transfer region 28 having a shape designed to maximize electromagnetic performance. Multilayer radio frequency interconnect apparatus 18 also includes an RF via 30, a plurality of RF ground vias 32, and a plurality of ground vias 34 The RF via 30 is disposed at the end of first signal conductor 24. The plurality of RF ground vias 32 are disposed along the length of first signal conductor 24. The plurality of ground vias 34 are disposed around signal transfer region 28.

Figure 3:
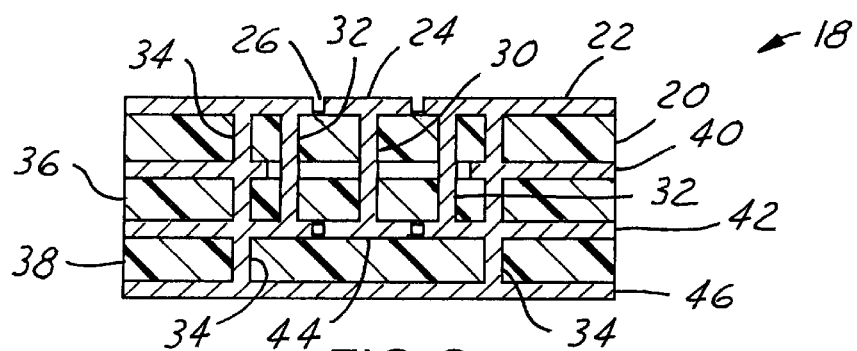
FIG. 3 is a cross sectional view of a multilayer radio frequency interconnect apparatus according to the present invention.

Referring to FIG. 3, a cross sectional view of a multilayer radio frequency interconnect apparatus 18 according to the present invention is illustrated. Multilayer radio frequency interconnect apparatus 18 includes a first ground layer 36 disposed under first coplanar wave guide (CPW) signal layer 20 and a second coplanar wave guide (CPW) signal layer 38 disposed under first ground layer 36. First ground layer 36 is etched to include a first ground conductor 40. Second coplanar wave guide (CPW) signal layer 36 is etched similar to first coplanar wave guide (CPW) signal layer 20 and includes a second RF ground conductor 42, a second signal conductor 44 and a backside ground layer 46. Second RF ground conductor 22 includes a signal transfer region having a shape designed to maximize electromagnetic performance.

As can be seen in FIG. 3, RF via 30 couples first signal conductor 24 to second signal conductor 44. RF ground vias 32 couple first RF ground conductor 22 to second RF ground conductor 42. Ground vias 34 couple first RF ground conductor 22, a first ground conductor 40, second RF ground conductor 42, and backside ground layer 46 together. In this way, the RF ground vias 32 are treated as RF lines, the RF ground vias 32 are isolated from the ground plane 40 which is located between RF layers 20, 38, and the RF ground vias 32 only connect between RF ground planes 40, 46 and RF layers 20, 38.

In operation, a RF signal launches from first signal conductor 24. The vertical transition from the first signal conductor 24 to the second signal conductor 44 is realized by a 3-wire transmission line. The center conductor of the 3-wire transmission line is RF via 30. Two outer conductors are RF ground vias 32 connect the first RF ground conductor 22 to the second RF ground conductor 42. These two RF ground vias 32 are isolated from the ground planes 40, 46 which are located between RF signal layers 20, 38. The advantage of this ground isolation is to maintain the 3-wire transmission line characteristic impedance and to reduce disturbance to electromagnetic fields such that a broadband design may be achieved. The RF ground vias are terminated at signal layers 20, 38. The typical ground vias built in the past were connected to the backside ground plane 46. From RF point of view, it is a short stub, which will cause performance degradation at high frequency. While the present invention is illustrated using two signal layers, one skilled in the art would realize that the present invention may be applied to a plurality of signal layers.

The present invention thus achieves an improved and reliable multilayer radio frequency interconnect system by using a coplanar waveguide to 3-wire to coplanar waveguide as a radio frequency interconnect. Because of this, the present invention substantially minimizes electromagnetic field disturbance in multilayer interconnects.

From the foregoing, it can be seen that there has been brought to the art a new and improved multilayer radio frequency interconnect system. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims.

What is claimed is:

1. A multilayer radio frequency interconnect apparatus comprising:

a first coplanar waveguide signal layer, said first coplanar wave guide signal layer including a first RF ground conductor plane, and a first signal conductor plane;

a first ground layer adjacent to and disposed below said first coplanar waveguide layer, said first ground layer including a first ground plane, said first ground plane coupled to said first RF ground plane through a plurality of ground vias;

a second coplanar waveguide signal layer adjacent to and disposed below said first ground layer, said second coplanar waveguide signal layer including a second RF ground conductor plane, and a second signal conductor plane, said second RF ground conductor plane coupled to said first ground plane through said plurality of ground vias, said second RF ground conductor plane coupled to said first RF ground conductor plane through a plurality of RF ground vias, said second signal plane couple to said first signal plane through a RF via; and a backside ground layer adjacent to and disposed below said second coplanar waveguide signal layer said backside ground layer comprising a second ground plane, said second ground plane coupled to said second RF ground conductor plane through said plurality of ground vias.

2. The multilayer radio frequency interconnect apparatus as recited in claim 1, wherein said first RF ground conductor plane includes a RF transition region.

3. The multilayer radio frequency interconnect apparatus as recited in claim 2, wherein said plurality of ground vias are disposed around said RF transition region.

4. The multilayer radio frequency interconnect apparatus as recited in claim 1, wherein said second RF ground conductor plane includes a RF transition region.

5. The multilayer radio frequency interconnect apparatus as recited in claim 1, wherein said plurality of RF ground vias are disposed adjacent to said first and second signal conductor planes.

6. The multilayer radio frequency interconnect apparatus as recited in claim 1, further comprising a third coplanar waveguide signal layer adjacent to and disposed between said first and second coplanar waveguide signal layers, said third coplanar waveguide signal layer including a third RF ground conductor plane, and a third signal conductor plane.

7. A satellite system comprising:

a ground station;

a satellite in orbit and in communication with said ground station, said satellite having an multilayer radio frequency interconnect apparatus comprising:
- a first coplanar waveguide signal layer, said first coplanar wave guide signal layer including a first RF ground conductor plane, and a first signal conductor plane;
- a first ground layer adjacent to and disposed below said first coplanar waveguide layer, said first ground layer including a first ground plane, said first ground plane coupled to said first RF ground plane through a plurality of ground vias;
- a second coplanar waveguide signal layer adjacent to and disposed below said first ground layer, said second coplanar waveguide signal layer including a second RF ground conductor plane, and a second signal conductor plane, said second RF ground conductor plane coupled to said first ground plane through said plurality of ground vias, said second RF ground conductor plane coupled to said first RF ground conductor plane through a plurality of RF ground vias, said second signal plane couple to said first signal plane through a RF via; and
- a backside ground layer adjacent to and disposed below said second coplanar waveguide signal layer said backside ground layer comprising a second ground plane, said second ground plane coupled to said second RF ground conductor plane through said plurality of ground vias.

8. The satellite system as recited in claim 7, wherein said first RF ground conductor plane includes a RF transition region.

9. The satellite system as recited in claim 8, wherein said plurality of ground vias are disposed around said RF transition region.

10. The satellite system as recited in claim 7, wherein said second RF ground conductor plane includes a RF transition region.

11. The satellite system as recited in claim 1, wherein said plurality of RF ground vias are disposed adjacent to said first and second signal conductor planes.

12. The satellite system as recited in claim 1, further comprising a third coplanar waveguide signal layer adjacent to and disposed between said first and second coplanar waveguide signal layers, said third coplanar waveguide signal layer including a third RF ground conductor plane, and a third signal conductor plane.

* * * * *